United States Patent [19]

Camenzind

[11] Patent Number: 4,713,660

[45] Date of Patent: Dec. 15, 1987

[54] ELECTRONIC PROXIMITY KEY AND LOCK

[76] Inventor: Hans R. Camenzind, 166 Hawthorne Ave., Los Altos, Calif. 94022

[21] Appl. No.: 896,591

[22] Filed: Aug. 14, 1986

Related U.S. Application Data

[63] Continuation-in-part of Ser. No. 763,333, Aug. 6, 1985, abandoned.

[51] Int. Cl.[4] .............................................. H04Q 1/00

[52] U.S. Cl. ........................... 340/825.69; 340/825.72

[58] Field of Search ................ 365/100; 361/171, 172; 340/825.63, 825.64, 825.69, 825.72, 825.31, 825.32, 825.33, 64, 539, 542, 543, 825.79, 825.83, 384 E; 375/25, 23; 331/173; 332/16 R

[56] References Cited

U.S. PATENT DOCUMENTS 3,337,992 8/1967 Tolson ........................... 340/539 X
3,428,954 2/1969 David ................................ 365/100
4,072,898 2/1978 Hellman et al. ...................... 375/23
4,143,368 3/1979 Route et al. ........................ 340/543

*Primary Examiner*—Ulysses Weldon
*Attorney, Agent, or Firm*—Allston L. Jones

[57] ABSTRACT

An electronic lock is actuatable by an electronic key. The key comprises a plurality of different resistive elements and a signal generator having a plurality of different timing periods. The key further has a signal transmitter. The electronic lock means comprises a lock and a signal receiver. The lock further has a comparator which includes a plurality of different resistive means. The comparator compares each consecutive timing period with the timing period determined by one of the resistive means. The lock further has an activating element for the lock in the event the consecutive timing periods of said signal match the timing periods determined by the plurality of resistive means.

14 Claims, 3 Drawing Figures

ELECTRONIC PROXIMITY KEY AND LOCK

This is a continuation-in-part application of a co-pending application filed on Aug. 6, 1985, Ser. No. 06/763,333 now abandoned.

DESCRIPTION

1. Technical Background

The present invention relates to an electronic key and an electronic lock, and a system therefor, and wherein the combination of the lock is determined by a plurality of different time periods caused by different resistive values in a plurality of resistors.

2. Background of the Invention

Electronic key and lock systems are well-known in the art. Typically, they have the advantage over mechanical key and lock systems in that they are less prone to being tampered with and have greater combinations. Thus, see, for example, U.S. Pat. Nos. 4,383,242; 3,257,651; 3,787,714; 3,835,454; 4,091,328; and 4,232,291. U.S. Pat. No. 3,257,651 relates to a pulse-position modulator. U.S. Pat. No. 3,787,714 describes a key with a resistor network and contacts. U.S. Pat. No. 3,835,454 is a multiplexing scheme. U.S. Pat. No. 4,091,328 discloses a remote control radio system using duty cycle modulation. U.S. Pat. No. 4,232,291 describes an electronic key with resistors and capacitors and contacts. However, the resistance values of the resistors do not define the time periods of the transmitted signal. Finally, U.S. Pat. No. 4,383,242 relates to an automobile antitheft system using pulse-width modulation. The use of pulse-width modulation as the combination of the lock can lead to a more sophisticated circuitry and expensive equipment. Furthermore, such a key can require more power to generate.

U.S. Pat. No. 4,499,462 teaches a key using a plurality of pulses which has the same width but with the combination of the key being the width of the pause between the pulses. However, the pauses are compared to a stored code in which the pauses are identified either being "short" or "medium" or "long".

SUMMARY OF THE INVENTION

In the present invention, an electronic key, an electronic lock and a system are disclosed. The key comprises a plurality of different resistive means and a means which generates a signal having a plurality of different timing periods with each timing period determined by one of said resistive means. The key further has means for transmitting the signal.

The electronic lock means comprises a lock and a means for receiving the signal. The lock further has comparing means which includes a plurality of different resistive means. The comparing means compares each consecutive timing period with the timing period determined by one of the resistive means. The lock further has means for activating the lock in the event the consecutive timing periods of said signal match the timing periods determined by the plurality of resistive means.

DETAILED DESCRIPTION OF THE DRAWINGS

Figure 1:
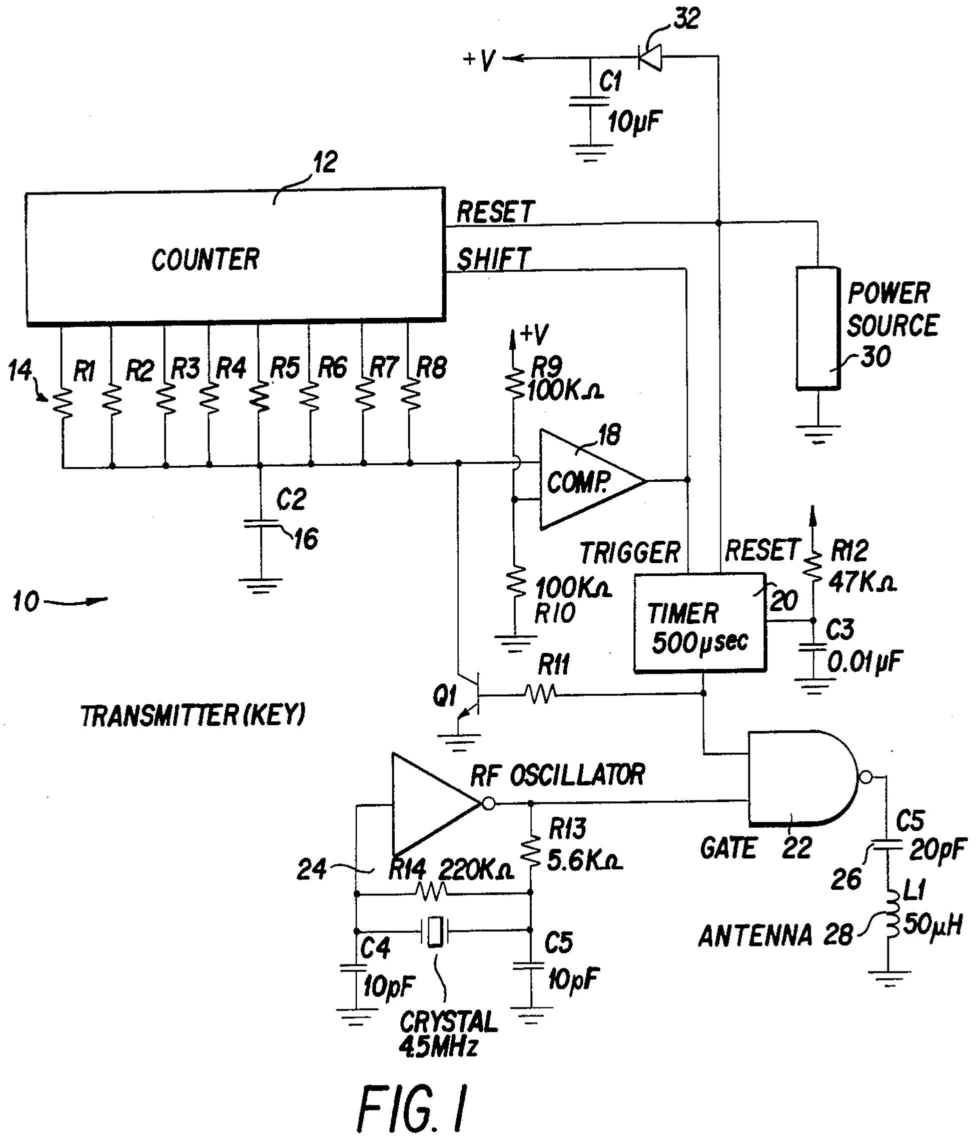
FIG. 1 is a schematic circuit diagram of the electronic key of the present invention.

Referring to FIG. 1, there is shown an electronic key 10 of the present invention. The electronic key 10 comprises a counter 12. The counter 12 has a plurality of outputs. A plurality of different resistive means 14 is connected to the counter 12. A single resistor of the plurality of resistive means 14 is connected to an output of the counter 12. The plurality of different resistors 14 are connected, having one common connection. The resistors comprise $R_1 \ldots R_8$. A single capacitor 16, $C_2$, is connected in series with the plurality of resistors 14. At the junction of the connection between the plurality of resistors 14 and the capacitor 16, the signal is supplied to a first input of a comparator 18. The comparator 18 has a second input. The second input of the comparator 18 comprises a resistive divider comprising the resistors $R_9$ and $R_{10}$. In the preferred embodiment, each of the resistors $R_9$ and $R_{10}$ are 100K ohms, respectively. The output of the comparator 18 is supplied to the shift input of the counter 12 and to a timer 20. A typical timer 20 is a one-shot monostable multivibrator.

At the junction of the plurality of resistors 14 and the capacitor 16, the signal is connected to a transistor Q1. The base of the transistor Q1 is connected to a resistor $R_{11}$ which is connected to the output of the timer 20. The output of the timer 20 is also supplied to a NAND gate 22. Another input of the NAND gate 22 is the output of an RF oscillator 24. The output of the NAND gate 22 is supplied to a capacitor 26, $C_6$ which is connected in series with a coil 28, $L_1$. In the preferred embodiment, the capacitor 26 is 20pf and the coil 28 is 50uH.

A power source 30 is also connected to the key 10. In the preferred embodiment, the power source 30 is of solar cells. The power source 30 is connected to the timer 20, along a reset line and is also connected to the reset input of the counter 12. In addition, the power source 30 is supplied to a diode 32 and is connected to a 10uf capacitor $C_1$. The output of the capacitor $C_1$ is the voltage source for all of the electronic components of the electronic key 10.

In the operation of the electronic key 10, the power source 30 charges up the capacitor $C_1$. When the solar cell is blocked briefly such that its voltage drops, a pulse is supplied along the reset line to the counter 12 and the timer 20. The pulse resets the counter 12 and the timer 20. The resetting of the timer 20 produces an output pulse of approximately 500 microseconds in duration. That pulse is supplied to the gate 22. The output of the RF oscillator 24 is also supplied to the gate 22. The RF oscillator signal passes through the gate 22 during the time period set by the pulse from the timer 20. This is supplied to the capacitor 26 and the coil 28 which functions as an antenna. Thus, a burst of RF signal, having a duration determined by the timer 20, is transmitted.

During the time that the burst of RF signal is transmitted, the capacitor 16, $C_2$, is discharged through the transistor $Q_1$. When the timer 20 finishes its pulse, the output of the timer 20 goes low, thereby blocking the RF signal from the oscillator 24 from being transmitted through the gate 22.

Capacitor 16, $C_2$, is charged by the counter 12 through the first resistor $R_1$ of the plurality of resistors 14. When the voltage across capacitor $C_2$ reaches a threshold which is set by the resistors $R_9$ and $R_{10}$, the output of the comparator 18 is shifted to a higher voltage. This causes a voltage shift to occur on the shift input to the counter 12 and on the timer 20. As for the timer 20, this causes the timer 20 to generate another pulse of approximately 500 microseconds in duration which is supplied to the gate 22. This permits the signal from the RF oscillator 24 to be passed therethrough and to be transmitted. The shifting of the voltage level on the output of the comparator 18 causes the counter 12 to shift one position. Again, during this time, the capacitor 16, $C_2$, is discharged through the transistor $Q_1$.

After the pulse from the timer 20 has elapsed, capacitor $C_2$ is to be charged by resistor $R_2$. Again, similar to the charging of the capacitor $C_2$ through $R_1$, this occurs until the voltage across $C_2$ reaches the level determined by $R_9$ and $R_{10}$. When that event occurs, the comparator 18 causes a shift in its voltage output. This causes the counter 12 to shift and to cause the timer 20 to issue another pulse. This pulse, supplied to gate 22, permits the RF signal from the oscillator 24 to be transmitted. During this time, the capacitor 16, $C_2$, is again discharged through the transistor $Q_1$.

The cycle repeats until capacitor $C_2$ has been charged by the last resistor $R_8$ and the timer 20 is triggered for the last time producing the final pulse which permits the signal from RF oscillator 24 to be transmitted.

As can be seen from the foregoing, the key 10 of the present invention transmits a plurality of bursts with each burst having substantially the same width, as determined by the timer 20. However, the pause or the off time between each burst is determined by the resistors $R_1$ through $R_8$. In particular, the pause between each RF burst is determined by $$T = A \times R_{(1\text{-}8)} \times C_2$$

where A is a constant determined by the ratio of resistors $R_9$ and $R_{10}$.

Figure 3:
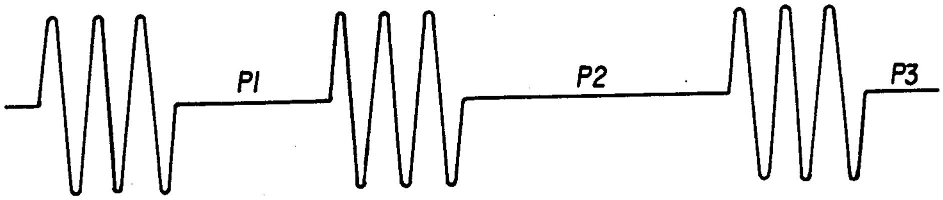
FIG. 3 is a timing diagram of the signal generated by the key of the present invention.

Referring to FIG. 3, there is shown a graph of a signal transmitted by the key 10, where $P_1$, $P_2$ . . . are the pauses between bursts of RF oscillation.

Figure 2:
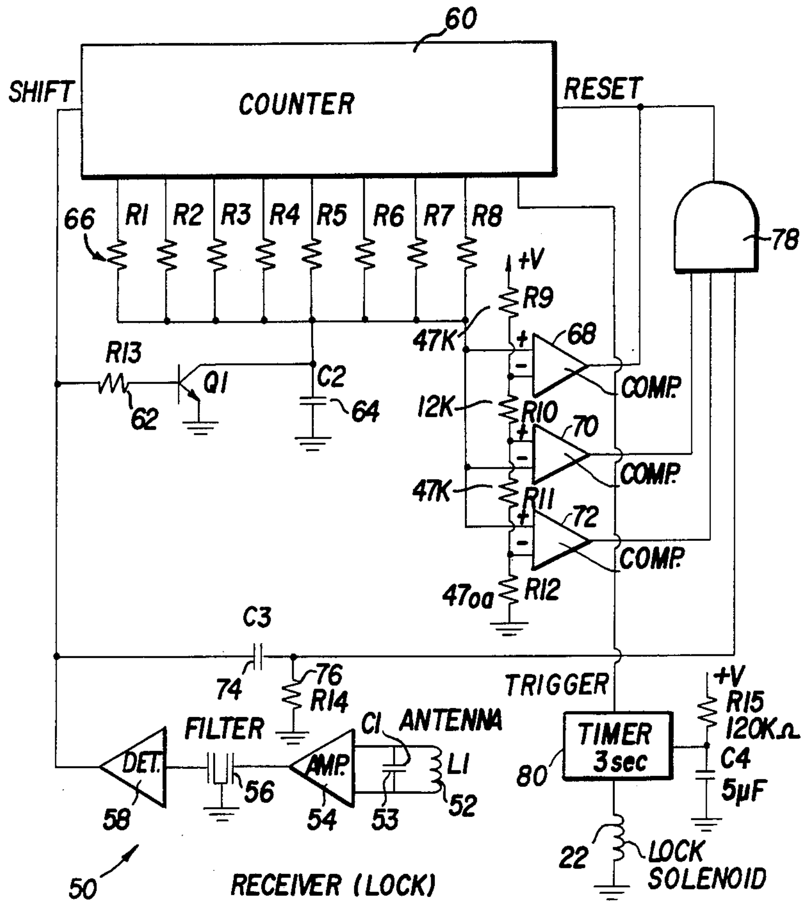
FIG. 2 is a schematic circuit diagram of the electronic lock of the present invention.

Referring to FIG. 2, there is shown an electronic lock 50 of the present invention. The lock 50 comprises a coil 52 which acts as an antenna and a capacitor 53 connected in parallel. The coil 52 is of substantially the same value as the transmitting coil 28 of the key 10 and forms a resonant circuit with the capacitor 53 receiving the transmitted signal from the key 10. The signal received by the lock 50 is supplied to an amplifier 54 which amplifies the signal and then supplies the amplified signal to a filter 56. The filter 56 then supplies the filtered amplified signal to a detector 58. The output of the detector 58 is an amplified, filtered and rectified signal which is stripped away of the radio frequency component and thus forms a train of pulses. The train of pulses has a plurality of pulses of substantially the same width but with time-varying pauses between each pair of consecutive pulses.

The plurality of rules is then supplied to a counter 60, which is the same counter as counter 12 of the key 10, along the shift input to the counter 60.

The counter 60 has a plurality of outputs. A plurality of resistors 66 is also connected to the counter 60, with each resistor connected to an output of the counter 60. The plurality of resistors is designated as $R_1$ through $R_8$. A capacitor 64 $C_2$ is connected in series with the plurality of resistors 66. The capacitor 64, $C_2$, is the same as the capacitor 16, $C_2$. A transistor $Q_1$ is connected in parallel to the capacitor 64. The base of the transistor $Q_1$ is connected to resistor $R_{13}$ which is connected to the output of detector 58. The junction of the plurality of resistors 66 and of the capacitor 64 is also connected to a plurality of comparators 68, 70 and 72. The junction is connected to a first comparator 68 at the plus input thereof. The junction is also connected to the second comparator 70 at the negative input thereof. Finally, the junction is connected to the third comparator 72 at the plus input thereof. A resistive divider comprising of resistors $R_9$, $R_{10}$, $R_{11}$ and $R_{12}$ is connected to the plurality of comparators 68, 70 and 72 at the minus, plus and minus input thereof, respectively. In the preferred embodiment, $R_9$ is 47K ohms, $R_{10}$ is 12K ohms, $R_{11}$ is 47K ohms and $R_{12}$ is 470 ohms.

The output of the first comparator 68 is connected to the reset input of the counter 60. The output of the second comparator 70 is supplied to an AND gate 78. The output of the third comparator 72 is also connected to the input of the AND gate 78. The signal from the detector 58 is also supplied to a capacitor 74 $C_3$ and a resistor 76 $R_{14}$ and is then supplied to the AND gate 78. The counter 60 has nine outputs with eight of those nine outputs connected to one of the resistors 66, $R_1$ through $R_8$, respectively. The ninth output is connected to a timer 80. The time 80 is connected to activate a lock solenoid 82.

In the operation of the lock 50 of the present invention, after the signal has been received, amplified, filtered and rectified, the first pulse is used to discharge capacitor 64, $C_2$. During the pause after the first pulse, the counter 60 charges capacitor 64 $C_2$ through resistor $R_1$. The discussion will now be of the case where the resistors $R_1$ through $R_8$ are of the same value as the resistors $R_1$ through $R_8$ of the electronic key 10.

When the counter 60 charges through R1, the capacitor 64 $C_2$, the voltage across the capacitor 64 is compared by the first, second and third comparators 68, 70 and 72, respectively. If the resistor $R_1$ corresponds to resistor $R_1$ in the key 10, then the voltage across the capacitor 64 $C_2$ at the instant the second pulse appears, reaches a level where it will trigger the second comparator 70. Since the output of the capacitor 64 $C_2$ is supplied to the negative input of the second comparator 70, this will cause the second comparator 70's output voltage to go from high to low. The voltage of the capacitor 64 C2 will be greater than the negative input to the third comparator 72. Thus, the output of the third comparator 72 will be a high votlage. As for the first comparator 68, the voltage across the capacitor 64 will not be greater than the voltage supplied to the negative input of the first comparator 68. Thus, the output of the first comparator 68 will remain in the low voltage state.

In summary, if $R_1$ matches the resistance of $R_1$ in the key 10, at the instant the second pulse appears, the output of the first comparator 68 will continue to be of low voltage, the output of the second comparator 70 will have gone from a high voltage to a low voltage and the output of the third comparator 72 will be of high voltage. The output of the first comparator 68, since it has remained the same, will not reset the counter 60. The output of the second and the third comparators 70 and 72, respectively, are supplied to an AND gate 78. Since the second comparator 70's output will be low, the AND gate 78 will never be triggered. Thus, when the second pulse appears, capacitor 74 $C_3$ and resistor 76 $R_{14}$ produces a short pulse which marks the leading edge of the arriving pulse. This is also supplied to the AND gate 78. However, since the output of the second comparator 70 will be low, this is not then passed through and does not reset the counter 60.

When the second pulse arrives, the second pulse will discharge capacitor 64 $C_2$ through transistor $Q_1$. The second pulse also shifts the counter 60. Again, if the resistor value of $R_2$ matches the resistor value $R_2$ in the key 10, the output of the first comparator 68 will remain the same, thus not resetting the counter 60. The output of the second comparator 70 will go from high to low voltage. The output of the third comparator 72 will be of high voltage. The arrival of the third pulse will not cause a pulse to be passed through the AND gate 78 to reset the counter 60. The third pulse will then shift the counter 60. This continues until the ninth pulse is detected, which then shifts the counter 60 causing it to reset itself and trigger the timer 80. The timer 80 activates the lock solenoid 82, thereby opening the door for a period of approximately three seconds.

If, however, any of the resistors in the plurality of resistors 66 is not correct, then the voltage across the capacitor 64 $C_2$ will be either above the threshold of the first comparator 68 or below the threshold of the second comparator 70.

For example, if the particular resistor in the plurality of resistors 66 is smaller than the corresponding resistor in the plurality of resistors 14 in the key 10, capacitor 64 $C_2$ would charge at a faster rate than the same capacitor 16 $C_2$ in the key 10. Thus, by the time the subsequent pulse arrives, the voltage across the capacitor 64 $C_2$ would be greater than the input on the negative input to the first comparator 68, causing the output of the first comparator 68 to go from low to high. This would then reset the counter 60.

On the other hand, however, if the particular resistor in the plurality of resistors 66 is greater than the corresponding resistor in the plurality of resistors 14 in the key 10, the capacitor 64 $C_2$ would charge at a slower rate than the capacitor 16 $C_2$ in the key 10. Thus, by the time the subsequent pulse arrives, the voltage across the capacitor 64 $C_2$ would not be greater than the input supplied to the second comparator 70 on the plus input. Thus, the output of the second comparator 70 would remain high. The voltage across the capacitor 64 $C_2$, however, is greater than the voltage on the negative input of the third comparator 72 (which is approximately 0.3 volts). This would cause the output of the third comparator 72 to remain high. When the subsequent pulse arrives, capacitor 74 $C_3$ and resistor 76 $R_{14}$ will produce a short pulse that is supplied to the AND gate 78. Since the other two inputs to the AND gate 78 remain high, the pulse is passed through the AND gate 78 and resets the counter 60.

When the counter 60 is reset, the counter 60 would then charge the capacitor 64 $C_2$ through the starting resistor $R_1$. The counter 60 would then progress sequentially again through the resistors $R_1$ through $R_8$. However, as can be seen, if there are nine pulses and if the counter 60 is reset during one of the pulses, the ninth pulse would never cause the counter 60 to trigger the timer 80. Thus, the lock is never opened if the counter is reset after the first pulse. After the last pulse, the pause (which would be the time period between users and, therefore, long) would cause the counter 60 to reset again. Thus, the counter 60 would be ready to receive the first pulse of a new attempt to open the lock.

As previously stated, the voltage input to the negative input of the third comparator 72 is a very low voltage (approximately 0.3 volts). If no resistor has been inserted in any position, then the capacitor 64 $C_2$ would have zero voltage across it. The output of the second comparator 70 would remain high. However, the output of the third comparator 72 would be low. Thus, the output of the third comparator 72 prevents a subsequent pulse from resetting the counter 60.

There are many advantages to the key and lock of the present system. First, by using insertable resistors to determine the combination of the lock, the number of choices is greatly expandable. Since the resistor values are discrete, at least ten choices of resistor values per position is possible. With eight resistor position, the number of possible combinations is 100,000,000. Furthermore, with the use of insertable resistors, locks and combinations thereof can be easily changed by extracting the resistors and inserting new resistors therein.

In addition, a hierarchy can be created. For example, if resistors are inserted only in the first four positions in the key, then it can unlock only a lock which has been set to require four or fewer digits. A master key that can open locks that require, for example, eight positions would, of course, have eight resistor positions. Furthermore, by having a third comparator 72 which detects when the capacitor 64 is not being charged; i.e., no resistor has been inserted into one or more of the positions, the lock can accept any resistor value as being the correct value of that position. This further adds to the possibility of hierarchy and master key concept.

The basis of the present invention is that very short transmission duration, less than 1/10 of a second, which consists mostly of pauses interrupted by brief 500 microseconds of RF pulses. The short range requires very little RF power, on the order of 300 microwatts. This allows the key 10 to be powered simply from a large capacitor, such as a 10 microfarads, which can be charged from a solar cell, a small battery or a piezoelectric transducer. The transmission can then be triggered by interrupting the light incident on the solar cell briefly or by striking the piezoelectric transducer or automatically in either fixed time intervals or whenever the voltage across the large capacitor reaches a sufficient level. Finally, of course, by simply increasing the counter and adding more resistors, more than one combination in the key can be created which can open more than one lock. Furthermore, by having a pulse train comprising a plurality of pulses, each having substantially the same width, circuitry is simplified. In addition, power consumption is minimized.

The essence of the invention is the use of resistive values to create precise timing periods. The timing periods can be the pauses between consecutive pulses of substantially equal duration, as described. Alternatively, the timing periods can be the width of the pulses as in pulse width modulation, or any other form in which each resistive value determines a unique timing period which is in the signal transmitted by the key. While one preferred embodiment for has been described, other embodiments to accomplish the same goal are possible. For example, one could use an A-to-D converter to convert a resistive value to a timing period. One could also add charge to a small capacitor in precise intervals determined by a quartz crystal oscillator, and let the oscillator run until the voltage across the capacitor reached a level equal to a voltage level across the resistor. Clearly, other embodiments are possible. For example, the lock can be implemented by using a microprocessor with memory with the value of the timing periods stored in the memory.

What is claimed is:

1. An electronic key and lock system comprising: a key means comprising:

a first plurality of different resistive means;

means for generating a first signal having a plurality of different timing periods with each timing period determined by one of said resistive means; and means for transmitting said first signal; and a lock means comprising:

a lock;

means for receiving said first signal;

a first charging means responsive to said received first signal;

a second plurality of different resistive means connected with one conection in common and being selectively activable by said charging means;

a first capacitor, said capacitor connected in series to said plurality of resistive means at the common connection and being charged by said charging means through one of said plurality of resistive means;

first discharging means for discharging said capacitor;

first comparing means connected to the junction of said second plurality of resistive means and said capacitor for comparing each consecutive timing period of said first signal with the timing period determined by a different one of said second plurality of resistive means; and means for activating said lock in the event the consecutive timing period of said first signal match the timing periods determined by said second plurality of different resistive means.

2. The system of claim 1 where said first signal is a first pulse train comprising a plurality of pulses, with each pulse having substantially the same width, and with a pause between each pair of consecutive pulses, with the time period of each of said pauses being each of said timing periods.

3. The system of claim 2 wherein said key means further comprises a trigger means for triggering said generating means to generate said first pulse train of said first signal.

4. The system of claim 3 wherein said trigger means of the key means further comprises:

a second charging means;

said first plurality of resistive means connected with one connection in common and being selectively activatable by said second charging means;

a second capacitor, said second capacitor connected in series to said first plurality of resistive means at the common connection and being charged by said second charging means through one of said first plurality of resistive means;

second discharging means for discharging said second capacitor; and second comparator means having a present threshold level for receiving the output of said second capacitor and for triggering said generator means when the output of said second capacitor reaches said level.

5. The system of claim 4 wherein said second charging means includes a counter, said counter for sequentially activating said first plurality of resistive means.

6. The system of claim 1 wherein said transmitting means of the key means further comprises a radio frequency oscillator.

7. The system of claim 1 wherein said means for receiving said first signal of the lock means comprises:

a tuned circuit for detecting said first signal; and processing means for processing said first signal to produce a second pulse train.

8. The system of claim 7 wherein said processing means of the lock means comprises:

means for amplifying said first signal to produce an amplified first signal;

means for filtering said amplified first signal to produce a filtered amplified first signal; and means for rectifying said filtered amplified first signal to produce said second pulse train.

9. The system of claim 1 wherein said first charging means of the lock means includes a counter.

10. An electronic lock apparatus comprising:

a lock;

means for receiving a radio frequency signal comprising a plurality of timing periods;

a charging means;

said plurality of resistive means connected with one connection in common and being selectively activable by said charging means;

a capacitor, said capacitor connected in series to said plurality of resistive means at the common connection and being charged by said charging means through one of said plurality of resistive means;

means for discharging said capacitor;

comparing means for comparing each consecutive timing period of said signal with the time period of said signal with the time period determined by one of said resistive means; and means for activating said lock in the event the consecutive timing periods match the time periods determined by said plurality of resistive means.

11. The lock of claim 10 wherein said signal is a pulse train comprising a plurality of pulses, with each pulse having substantially the same width, and with a pause between each pair of consecutive pulses, with the time period of each of said pauses being each of said timing periods.

12. The lock of claim 11 wherein said means for receiving said pulse train comprises:

a tuned circuit for producing a first signal in response to said radio frequency signal; and means for processing said first signal to produce said pulse train.

13. The lock of claim 12 wherein said means for processing said first signal further comprises:

means for amplifying said first signal to produce an amplified first signal;

means for filtering said amplified first signal to produce a filtered amplified first signal; and means for rectifying said filtered amplified first signal to produce said train pulse.

14. The lock of claim 10 wherein said charging means includes a counter.

* * * * *